United States Patent [19]

Krayer, III

[11] 3,889,943

[45] June 17, 1975

[54] PLATEN TRANSPORT FOR AUTOMATIC DOCUMENT HANDLER

[75] Inventor: Harry J. Krayer, III, Fairport, N.Y.

[73] Assignee: Xerox Corporation, Stamford, Conn.

[22] Filed: Apr. 26, 1974

[21] Appl. No.: 464,394

[52] U.S. Cl. .................................. 271/4; 271/233
[51] Int. Cl. ............................................ B65h 9/06
[58] Field of Search ............ 271/4, 233, 3, 5, 6, 7, 271/10, DIG. 9, 226, 245, 246, 243, 244, 272–277

[56] References Cited
UNITED STATES PATENTS
3,790,158   2/1974   Summers et al. ..................... 271/4

*Primary Examiner*—Richard A. Schacher
*Assistant Examiner*—Bruce H. Stoner, Jr.

[57] ABSTRACT

An automatic document handler for supplying and removing documents from the platen of a processing apparatus such as a copying machine. To position the documents properly for copying, the document handler includes a register against which the document trailing edge is abutted through reversal of a platen transport. The platen transport comprises an endless belt conveyor supported above the platen, normal sag in the belt allowing the belt to contact the platen to provide the driving force for moving a document across the platen, a biased roll being provided to force the platen belt down against the register to provide a nip force between the belt and the register greater than the force between the belt and the platen to assure positive driving of the document over the register for placement of the document on the platen.

5 Claims, 4 Drawing Figures

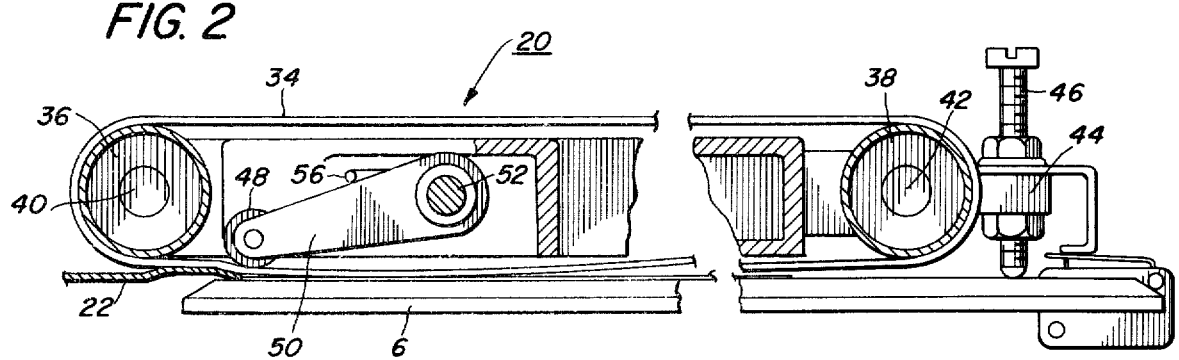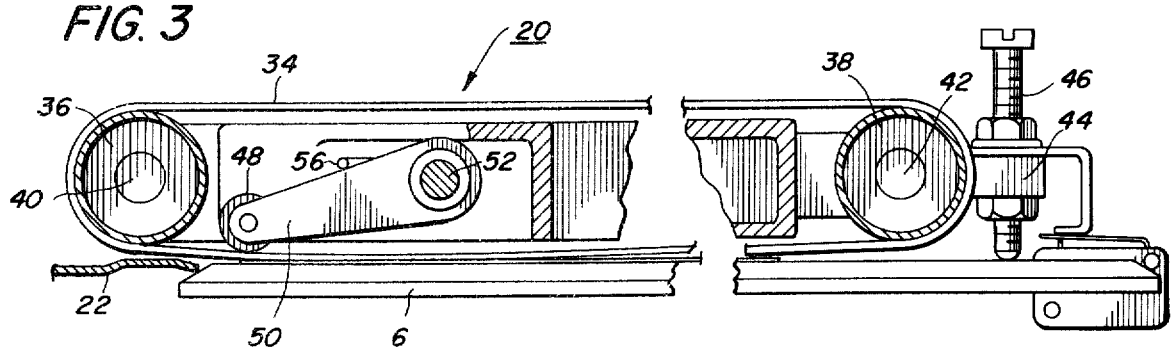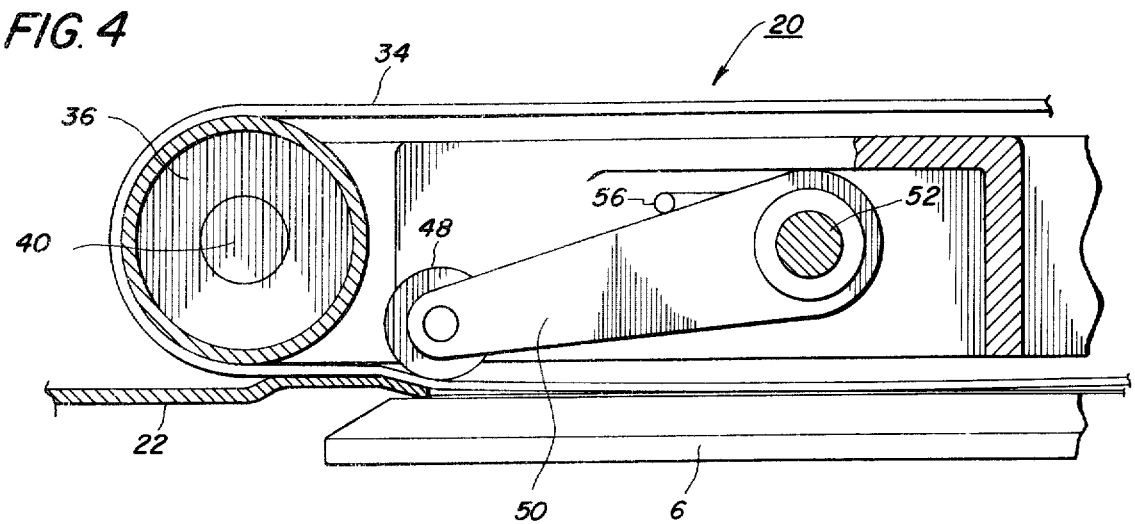

PLATEN TRANSPORT FOR AUTOMATIC DOCUMENT HANDLER

BACKGROUND OF THE INVENTION

With the advent of high speed copiers, such as xerographic reproduction machines, automatic document handlers are required to rapidly place and remove documents from the platen of the copy machine to enable the machine to produce copies at its full potential. The document handler must first separate the document to be copied from others awaiting copying. Following this the document must be brought into position on the machine platen and located in a certain position to assure the making of a complete and visually acceptable copy. To assure that the document is positively driven onto the platen of the copy machine and accurately located thereon, a substantial nip pressure must be employed between the rolls or belts utilized to feed the document onto the platen. However, the original document must always be handled with care to avoid tearing creasing or other mutilation thereto. This, of course, is particularly true when the original is one of a kind. In copending application Ser. No. 250,905, filed May 8, 1972, and commonly assigned with the present invention, there is disclosed an automatic document feeder employing a platen belt which is spaced above the platen to minimize generation of static electricity and reduce wear and tear on the platen belt and platen glass which would ordinarily be encountered if the belt were in contact with the platen glass along its entire length. To provide for positive feeding of the document onto and off of the platen, a biased roller is provided adjacent the registration edge to provide line contact between the platen belt and the platen. While this provides a dramatic improvement in the document handling capabilities of the document handler disclosed, the nip force beneath the bias roller between the belt and the platen glass may be sufficient to wrinkle or otherwise damage a light weight document as the document is driven against the registration edge for location of the document on the platen prior to copying.

SUMMARY OF THE INVENTION

This invention relates to an apparatus for feeding and removing documents from the platen of an automatic copying machine including a transport belt adapted for cooperation with the platen of the copy machine for moving documents onto and off the platen. A register edge movable up into and down, out of the document path is adapted for movement into the document path after the document is placed on the platen, after which the platen belt is reversed to force the document against the registration edge for proper positioning of the document on the platen. Internal roller means are provided for supporting the transport belt therearound such that an operating run of the belt is stretched across the platen surface, the roller means including belt support rollers adjacent the side boundaries of the platen surface with the belt operating run extending therebetween across the platen surface, the belt rollers being rotatably supported in substantially parallel relationship such that the outer surface of the portion of the belt wrapped about the rollers is spaced slightly above the plane of the platen surface, a pressure roller being disposed opposite the platen surface and registration edge for contact with the belt to force the portion of the belt riding thereagainst downwardly against the registration edge when the registration edge is in the "up" position to provide a driving force therebetween for feeding the document onto the platen, movement of the registration edge into the "down" position causing the pressure roller to force the portion of the belt riding thereagainst downwardly into contact with the platen to provide a positive driving force for removing the documents from the platen, the driving force for moving the document against the register edge after it is placed on the platen being provided by the force generated between the belt and the platen glass due to the sag of the belt between the pressure roller and the rear support roller.

BRIEF DESCRIPTION OF THE DRAWINGS

FIG. 2 is a side view showing the document transport belt with the improved line contact roller providing line contact of the platen belt against the register edge for feeding documents onto the platen of the copy machine;

FIG. 3 is a side view showing the document transport belt and the improved line contact roller position when the register edge is retracted to provide line contact between the transport belt and platen glass for removing the document from the platen of the copy machine; and FIG. 4 is an enlarged side view of the register portion of the document handler illustrated in FIG. 2.

DESCRIPTION OF THE PREFERRED EMBODIMENT

Figure 1:
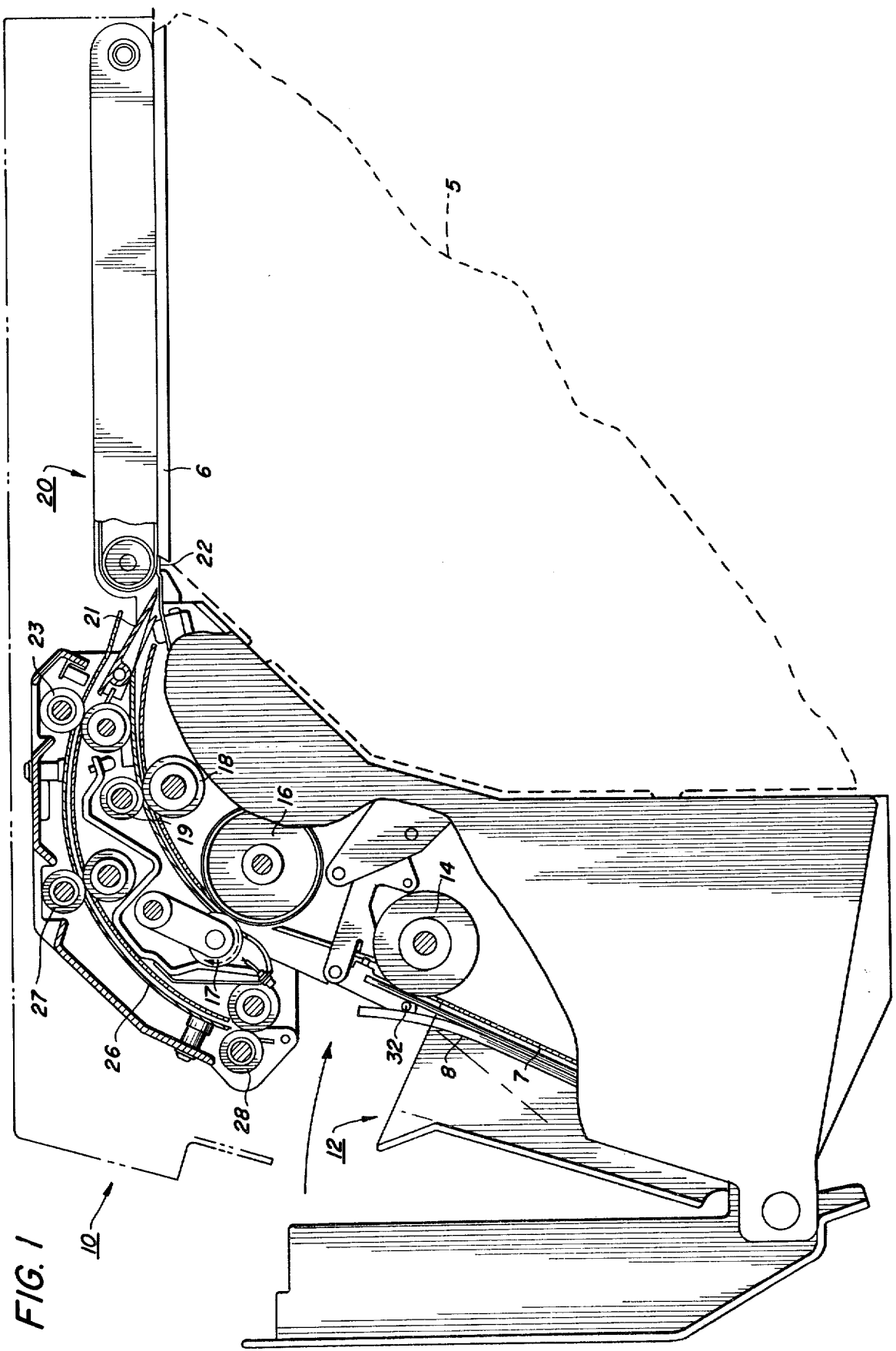
FIG. 1 is a side view in cross-section showing a document handler incorporating the improved document transport belt of the present invention in operative association with a document copying machine.

Referring to the drawings, there is shown a document handler designated generally by the numeral 10 incorporating the platen transport of the present invention. Document handler 10 may be used with any suitable document processing apparatus, such as a reproduction machine 5, which has a platen 6 on which the document to be copied is placed. Document handling apparatus 10 includes a supply tray 12 for storing both documents 7 to be copied and documents 8 already copied. From tray 12, one document at a time is advanced from the bottom of supply 7 by an intermittently operated primary feed roll 14 into the nip of retard roll pair 16, 17. The lower roll 16 is driven in a document feeding direction while the upper roll 17 is driven in the reverse or document reject direction (as shown by the dotted line arrow in FIG. 1) through a suitable slip coupling which normally enables the lower roll 16 to override the reverse drive input to roll 17 and thereby turn roll 17 in the document feeding direction. However, if two or more documents enter the nip of roll pair 16, 17, the reduced friction between the overlapping documents reduces the frictional drive force between roll pair 16, 17, permitting the slip clutch to engage and drive roll 17 in the reverse, document rejecting direction.

The document emerging from retard roll pair 16, 17 passes into the nip of intermediate roll pair 18, 19, and from there underneath deflector plate 21 to platen transport 20. Transport 20, which comprises a belt-type conveyor, first carries the document forward onto platen 6 until the entire document is positioned thereon. Transport 20 is then reversed to bring the document trailing edge against register 22. Register 22 locates the document in copying position following which the copy or copies are made by the copying apparatus 5.

When copying is completed, platen transport 20 is again started in reverse to move the document backwards off platen 6, register edge 22 being previously retracted for this purpose. Deflector 21, which was previously lowered, guides the returning document upwardly into the nip of return roll pair 23. Roll pair 23 moves the document along suitable return guides 26 through second and third return roll pairs 27, 28 respectively, and back into tray 12.

To maintain copies documents which have been designated for convenience by the numeral 8, segregated from documents 7 awaiting copying, and prevent inadvertent or premature refeeding of the returned documents 8 by feed roll 14 following feed of the last one of the documents 7, a displaceable bail or separator bar 32 is provided. Bail 32 is disposed substantially opposite to and above primary feed roll 14 to prevent documents resting thereon from contacting roll 14. Bail 32 may be reset onto the top of the documents in tray 12 when it is desired to refeed the documents to copying machine 5. For a complete description of mechanisms suitable for moving the bail bar 32, register 22 and deflector 21, reference may be had to the aforementioned U.S. Pat. application Ser. No. 250,905.

Referring particularly to FIGS. 2, 3, and 4 of the drawings, platen transport 20 consists of an endless, flexible belt 34, the outer surface of which is light reflective. One such belt construction is disclosed in U.S. Pat. No. 3,482,676 to G. E. Fackler. Platen belt 34 is stretched about drive and idler roll pair 36 and 38 respectively, rolls 36 and 38 being arranged on opposite sides of platen 6 with the axis of roll 36 being above register 22 while that of roll 38 is above the far side of platen 6. Roll shafts 40 and 42 are rotatably supported in sides (not shown) of the platen transport 20. The sides each carry a projection 44 adjacent idler roll 38 for receiving adjustable stop screws 46 therein. The stops 46 may be adjusted to provide the required spacing of the platen belt above the surface of the platen. The dimension and mounting of the belt supporting roll pair 36, 38 and the adjustment of screw 46 is such that the surface of platen transport belt 34 therearound is spaced slightly above the level of platen 6 as seen in FIGS. 2 and 3. An internal pressure roll 48 is provided, roll 48 engaging belt 34 proximate the inlet to platen 6 to force the belt 34 against register 22 when register 22 is in the up position. It should be noted by reference to FIG. 2 that the pressure roll 48 does not force the belt 34 into contact with the platen adjacent register 22. Roll 48 is rotatably supported by arms 50 which in turn are pivotally carried from cross shaft 52. Shaft 52 is supported in the sides of the transport (not shown). Springs 56 force arms 50 and pressure roll 48 downwardly such that the roll 48 forces a line portion of the belt 34 into contact with the upper edge of register 22. As a result, a line-like portion of the platen transport belt 34 normally rides against the edge of register 22 to provide a nip force therebetween for driving the documents onto the platen 6. Adjustable stops 46 are adjusted such the the platen belt 34 adjacent roll 38 is spaced from the platen 6 but sufficiently close thereto such that normal sag of the platen belt 34 contacts the platen glass in a central area relative to rolls 48 and 38. By this arrangement a positive driving force is provided between the belt and the register edge to drive documents onto the platen while an absolute minimum force between the belt and the platen glass is provided to force the document against the registration edge when the platen belt is reversed for registering the document, thereby providing minimal wear and tear on the document to be copied. By reference to FIG. 3 which illustrates the platen transport of FIG. 2 with the register 22 in the down position, it can be seen that roll 48 is allowed to drop downwardly toward the platen 6 to force the belt 34 into positive engagement with the lead edge of the document thereon to provide sufficient force between the platen belt 34 and the document for positively driving the document off from the platen preparatory to the placement of the succeeding document.

From the foregoing, it can be seen that by a very simple but unobvious modification of a document handler of the type disclosed in the aforementioned U.S. Pat. application Ser. No. 250,905, a substantial improvement in the operation thereof is obtained through the relocation of pressure roller 48 to provide a positive nip force between the platen belt 34 and the register 22 for driving documents onto the platen of a copy machine, provide minimal force between the platen belt and the platen for driving the document against the register edge to minimize damage thereto, and upon movement of the register edge off of the platen, provide a positive nip force between the platen belt and the platen glass for positively driving the document off from the platen.

While I have described a preferred embodiment of my invention, it should be understood that the invention is not limited thereto but may be otherwise embodied within the scope of the following claims:

What is claimed is:

1. In a document handling apparatus for moving documents into copying position on the platen of a document copying machine, the combination of:

a flexible document transport belt;
 a pair of interior support rolls about which said belt is operatively disposed, said support rolls being spaced apart to support said transport belt opposite to and extending across at least a portion of said platen;
 means for rotatably supporting each of said rolls so that the surface of said transport belt therearound is spaced slightly above the plane of said platen whereby said belt operating run adjacent said rolls is spaced above and out of document driving relationship with said platen;
 a register edge movable into and out of the document path adjacent said platen; and
 internal pressure means adapted to force a line portion of said belt operating run downwards towards said register edge into document driving relationship with said register edge when said register edge is in the document path for positively driving documents onto said platen between said register edge and the line portion of said belt thereagainst, normal sag in said transport belt allowing said belt to contact said platen between said support rolls for moving the document across said platen while preventing contact of the platen belt with the platen glass adjacent said register edge.

2. The apparatus according to claim 1 wherein said internal pressure means is adapted to force a line portion of said belt operating run downward into contact with said platen glass when said register edge is moved out of the document path to provide a driving force between said belt and said glass for driving said document off of the platen.

3. The apparatus according to claim 2 in which said internal pressure means includes a pressure roll interiorly of said belt engageable with said inside wall of said belt operating run.

4. The apparatus according to claim 3 in which said internal pressure means includes spring means to bias said pressure roll toward said platen.

5. In an apparatus for supporting a document transport belt of an automatic document handling device adapted for use with a copying machine having a relatively flat platen surface on which the document to be copied is positioned for copying purposes, the combination of:

internal roller means for supporting said belt therearound such that an operating run of said belt is stretched across said platen surface, said roller means including belt support rollers adjacent the side boundaries of said platen surface with said belt operating run extending therebetween across said platen surface;

means for rotatably supporting each of said belt rollers in substantially parallel relationship such that the surface of said belt at the periphery of said rollers is spaced slightly above the plane of the platen surface;

a register edge movable into and out of the document path, said register edge being movable into the document path after a document is removed from the platen, movement of a document over the register edge onto the platen and subsequent reversal of the platen belt causing the document to be forced against the register edge and properly located on the platen, movement of the register edge out of the document path and operation of the platen belt in the reverse direction causing the document to be moved off of the platen; and at least one pressure roller disposed opposite said platen surface between said support rollers for contact with said belt operating run to force the portion of said belt riding thereagainst downwardly against said register edge when said register edge is disposed in the document path for driving the document between said belt and said register edge onto the platen, contact of said register edge by said belt preventing contact of the platen by said belt adjacent said pressure roller, the axis of said pressure roller being substantially parallel with the axis of said belt support rollers, movement of said register edge out of the document path allowing said pressure roller to force the portion of said belt riding thereagainst downwardly into engagement with the document on said platen surface to provide driving engagement between said portion of said belt and said document for moving said document off of the platen.

* * * * *